(12) United States Patent
Lundström

(10) Patent No.: US 7,539,180 B2
(45) Date of Patent: May 26, 2009

(54) ASSOCIATION OF CHARGING BETWEEN COMMUNICATION SYSTEMS

(75) Inventor: Johan Lundström, Pargas (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1412 days.

(21) Appl. No.: 10/171,534

(22) Filed: Jun. 17, 2002

(65) Prior Publication Data

US 2002/0191597 A1 Dec. 19, 2002

(30) Foreign Application Priority Data

Jun. 19, 2001 (GB) ................................. 0114948.3

(51) Int. Cl.
*H04L 12/66* (2006.01)
(52) U.S. Cl. .................................................... 370/356
(58) Field of Classification Search ................ 370/356, 370/400, 352, 331, 338, 349, 328, 340, 260, 370/261, 432, 231, 395, 401, 270, 389, 329, 370/235, 469, 351, 248; 455/422, 406, 445, 455/435, 452, 1, 405, 408, 428, 422.1, 407, 455/453, 412, 561, 433; 709/249, 406, 405, 709/226–228, 246, 231, 225, 230, 203, 206, 709/245, 201, 229, 232, 204, 217; 379/126, 379/144, 114, 115, 88.17, 93, 114.12, 114.1, 379/13

See application file for complete search history.

(56) References Cited

U.S. PATENT DOCUMENTS 6,240,091 B1 * 5/2001 Ginzboorg et al. .......... 370/401
6,496,690 B1 * 12/2002 Cobo et al. .................. 455/408
6,763,233 B2 * 7/2004 Bharatia ..................... 455/433
6,789,126 B1 * 9/2004 Saulpaugh et al. .......... 709/245
6,975,850 B1 * 12/2005 Hurtta et al. ................ 455/405
7,046,658 B1 * 5/2006 Kundaje et al. ............. 370/352
7,058,165 B2 * 6/2006 Koskinen et al. ....... 379/115.03

(Continued)

FOREIGN PATENT DOCUMENTS

EP 1 014 619 A1 6/2000

(Continued)

OTHER PUBLICATIONS

Jonne Soininen; GPRS and UMTS Release 2000 All-IP Option, Jul. 2000 , ACM SIGMOBILE Mobile Computing and Communications Review, ACM Press, vol. 4 Issue 3, pp. 30-37.*

(Continued)

*Primary Examiner*—Wing F Chan
*Assistant Examiner*—Prenell P Jones
(74) *Attorney, Agent, or Firm*—Nixon & Vanderhye P.C.

(57) ABSTRACT

A method of enabling charging information generated within a GPRS access network 4 to be associated with charging information generated within an IP Multimedia Core Network Subsystem, IMSS, the charging information relating to a multimedia call facilitated by the IMSS and carried by the GPRS network. The method comprises sending a SIP call identity from the IMSS to the GPRS network and/or a GPRS charging identity from the GPRS network to the IMSS. A received identifier is included in charging information messages generated by one or both of the GPRS network and the IMSS.

29 Claims, 3 Drawing Sheets

U.S. PATENT DOCUMENTS

| | | | |
|---|---|---|---|
| 2002/0058496 A1* | 5/2002 | Bos et al. | 455/406 |
| 2002/0068545 A1* | 6/2002 | Oyama et al. | 455/406 |
| 2002/0127995 A1* | 9/2002 | Faccinn et al. | 455/406 |
| 2002/0133600 A1* | 9/2002 | Williams et al. | 709/228 |
| 2002/0151312 A1* | 10/2002 | Rosemarijn Bos et al. | 455/452 |
| 2004/0077333 A1* | 4/2004 | Koskinen et al. | 455/406 |
| 2004/0101117 A1* | 5/2004 | Koskinen et al. | 379/126 |
| 2004/0196816 A1* | 10/2004 | Koskinen et al. | 370/338 |
| 2005/0101245 A1* | 5/2005 | Ahmavaara | 455/1 |
| 2005/0259796 A1* | 11/2005 | Wallenius et al. | 379/93.01 |
| 2006/0234674 A1* | 10/2006 | Koskinen et al. | 455/406 |

FOREIGN PATENT DOCUMENTS

| | | |
|---|---|---|
| EP | 1 026 853 A1 | 8/2000 |
| EP | 1 052 841 A2 | 11/2000 |
| WO | 97/29584 | 8/1997 |
| WO | 00/78080 A1 | 12/2000 |

OTHER PUBLICATIONS

*Wireless Communications and Networking Conference< 1999,* WCNC, 1999, IEEE, New Orleans, LA, USA, Sep. 21-24, 1999, Piscataway, NJ, USA, IEEE, US, Sep. 21, 1999, pp. 1422-1426, xP0103536542, ISBN: 0-7803-5668-3, Sevanto et al., "Multimedia Messaging Service for GPRS and UMTS".

* cited by examiner

ASSOCIATION OF CHARGING BETWEEN COMMUNICATION SYSTEMS

FIELD OF THE INVENTION

The present invention relates to the association of charging between communication systems. The present invention is applicable in particular, though not necessarily, to the association of charges between a GPRS network and an IP multimedia system

BACKGROUND TO THE INVENTION

Digital cellular telephone networks have relied in the main upon circuit switched channels to carry user traffic such as voice communications. A circuit switched channel is formed by the allocation of one slot per frame in a given TDMA channel. Whilst circuit switched connections have proved adequate for voice calls, they do not provide an efficient mechanism for transferring large amounts of data. For example, a user wishing to view a web page hosted on an Internet server will likely find that it takes an inordinately long time to download the page to a mobile telephone using a circuit switched connection.

To facilitate fast data transfers to mobile terminals, packet switched data services are being introduced to digital cellular telephone networks. For example, the General Packet Radio Service (GPRS) is currently being introduced to many GSM networks. Unlike circuit switched connections, a GPRS connection (referred to as a PDP context) for a given user does not necessarily occupy one slot per frame on a given TDMA channel. Rather, slots are only used when the user has data to send or receive. When there is no traffic to transmit, no slots are allocated to the user. When there is a large volume of data to transmit, the user may be allocated one or more slots per frame. GPRS will be available in future third generation networks such as UMTS networks. The introduction of packet switched services, and the resulting availability of high data transfer rates, will allow network operators to increase the range of services available to subscribers as well as to improve already available services. For example, multimedia services such as videoconferencing and document sharing are likely to prove extremely popular.

To facilitate the provision of multimedia services, the $3^{rd}$ Generation Partnership project (3GPP) has been developing a so-called IP Multimedia Core Network Subsystem (IMSS). IMSS communicates with the GPRS core network and contains all elements that are used to provide IP based multimedia services. For a mobile to mobile call, the IMSS will sit between two GPRS core networks (assuming the mobiles belong to different networks). Certain nodes of the IMSS may be owned by the operator of a first of the GPRS networks, with the remaining nodes being owned by the operator of the second network (some IMSS nodes may be owned by a third party). The base protocol for multimedia services is the IETF Session Initiation Protocol (SIP). SIP makes it possible for a calling party to establish a connection to a called party even though the calling party does not know the current IP address of the called party, prior to initiating the call. SIP provides other functionality including the negotiation of connection parameters (e.g. Quality of Service and codecs).

The introduction of new services will provide operators with both opportunities and challenges when it comes to charging subscribers. Certain operators may decide to charge subscribers separately for using the GPRS access network (e.g. based on a charge per unit of data) and for using a service (e.g. based on a charge per unit time). However, it is more likely that operators will want to issue only a single charge for using a multimedia service, for example so as to be able to offer a lower total tariff which is less than the sum of the two separate tariffs. Charging information generated by the GPRS access network (at either a GGSN or a SGSN) will be identified using a GPRS charging identity, whilst charging information generated by the IMSS (at a P-CSCF or S-CSCF node) will be identified using a SIP call identity. It will therefore be necessary for operators to be able to marry or match charging information associated with a given call in order to be able to generate a single charge. This applies to conventional charging systems in which Call Detail Records (CDRs) are sent from charging nodes to a mediation device or billing system, as well as to real time charging mechanisms using for example, the CAMEL Application Part (CAP) protocol.

SUMMARY OF THE PRESENT INVENTION

The process of matching or associating charging information generated by a GPRS access network and an IMSS is difficult for several reasons. As the GPRS network merely provides a bearer for IP data it is ignorant of the nature of the data, e.g. the GPRS network does not know that data which it is transporting relates to SIP signalling and/or a multimedia call. Furthermore, there is nothing in IP data received by the IMSS to identify explicitly the GPRS network connection used to convey the data to the IMSS—the specification of a generic mechanism for this purpose would not be possible given the broad application of IP. It is true that the IP packet carrying the SIP INVITE message contains a source IP address which implicitly indicates which access network and PDP context (in case of GPRS) is used for the SIP signalling, and additionally that the SIP INVITE message may contain the IP address that the calling party is going to use for receiving the media stream. These IP addresses could in principle be used to link charging information messages produced by the GPRS and the IMSS networks, assuming that both networks include the IP addresses in their charging information messages. However, this mechanism of linking charging information messages will not work in all cases. The reason for this is that in the case of dynamically allocated IP addresses (the most common case) very accurate timestamps would also be needed in the CDRs. Accurate timestamps are difficult to achieve, since the clocks in different network nodes are not always synchronised. Additionally, using IP addresses for linking charging information messages in addition to SIP Call Ids and GPRS Charging Identities, will make the linking quite complicated in a mediation device or a billing system. Due to the reasons mentioned above, an explicit, run-time mechanism for exchanging charging identifiers is needed. This applies regardless of whether the charging information generating node in the GPRS network and the charging information generating node in the IMSS are owned by different operators or by the same operator.

It will be appreciated that a multimedia call from an A-subscriber to a B-subscriber may involve two GPRS access networks and two IMSS networks (i.e. A-subscriber GPRS network→A-subscriber IMSS→B-subscriber IMSS→B-subscriber GPRS network). Charges from each of these networks may need to be allocated to the calling party (or at least associated together). The same problem of associating charging messages arises on both the A and B-subscriber sides.

It is an object of the present invention to overcome or at least mitigate the above noted disadvantages. This and other objects are achieved at least in part by providing for the exchange of connection and/or charging identifiers between a packet switched access network and a service network.

According to a first aspect of the present invention there is provided a method of enabling charging information generated within a packet switched access network to be associated with charging information generated within a service network coupled to the access network, the charging information relating to a service facilitated by the service network, the method comprising the steps of:

receiving a service initiation message at a node of the service network, the message containing an IP address allocated to the party initiating the service;

sending from said node of the service network to the access network, a charging association message containing the identified IP address and a service connection identifier; and upon receipt of the charging association message at the access network, identifying an access network session associated with said IP address.

The terms "initiation" and "initiating" as used here encompass for example the initiation of a service by a calling party and the answering of a connection request by a called party.

Preferably, a charging identity of the access network associated with the identified access network session is identified by the access network.

In one embodiment of the invention, said access network is a GPRS access network and said service network is an IP Multimedia Core Network Subsystem, IMSS, the charging association message relating to a multimedia call facilitated by the IMSS and carried by the GPRS network, and said service initiation message being a SIP INVITE message or SIP answer message and said service connection identifier being a SIP call identity. The access network session which is identified using the IP address is a PDP context or PDP contexts.

The method may comprise sending from the access network to the service network an access network charging identity in response to receipt of the charging association message at the access network.

The method may comprise including in charging information messages generated by one or both of the access network and the service network, a received identifier.

The method may comprise sending the charging association message from a node of the IMSS implementing a call state control function, CSCF, to a Gateway GPRS Support Node, GGSN, of the GPRS network. The GGSN may forward the SIP call identity to a Serving GPRS Support Node, SGSN, of the GPRS network. Where a GPRS charging identity is sent from the GPRS network to the IMSS, the identifier may be sent from a GGSN of the GPRS network to the node of the IMSS implementing a CSCF. The method may comprise sending from the GGSN to the CSCF node, the GGSN node identity for inclusion in charging information messages generated within the IMSS.

The method may comprise identifying at the service network an IP address of an access network gateway node using the IP address of the (calling or called) party initiating the service.

Identities may be transferred between the access network and the service network using the SIP protocol. Also other protocols between the access network and the service network may be used. This transfer may alternatively be done via a Charging Control Node, e.g. using the CAP and/or DIAMETER protocols.

The method may comprise sending from the service network to the access network an indication of the amount of data involved in the execution of a service in one or both transmission directions, and using said indication at the access network to generate charging messages in respect of data associated with the service.

The method may comprise sending information from the service network to the access network information to allow the access network to separate the byte stream associated with the service from other data. Said information may be an IP address identifying the correspondent host for the call or a port number of the UE bearing the cost of the call. The separation of the byte streams is carried out so that an indication may be given in charging information messages as to which service(s) the transferred data relates.

According to a second aspect of the present invention there is provided a method of reallocating charges from a subscriber to a service provider, the charges relating to the use of a packet switched access network to carry IP data associated with a service facilitated by the service provider, the method comprising:

sending a service identifier and the subscriber's IP address from the service provider to a gateway node of the access network; and at the gateway node, using the IP address to identify data associated with the service, and including the service identifier in charging information messages generated by the gateway node or at another node of the access network in respect of the identified data, and/or sending a gateway node charging identity from the gateway node to the service provider for inclusion in charging information messages generated by the service provider.

The service identifier may identify the service provider, such that the generated charging information messages will be allocated to the service provider.

The service provider may identify an IP address of the gateway node on the basis of an IP address belonging to the initiator of the service call and the service identifier and the subscriber's IP address are sent to the gateway node using the identified gateway node IP address.

The service provider may be for example the operator of a multimedia, WWW or WAP server coupled to the Internet or other IP network.

The charging information messages into which the service identifier is incorporated may be for example CAP charging messages or CDRs.

DETAILED DESCRIPTION OF CERTAIN EMBODIMENTS

Figure 1:
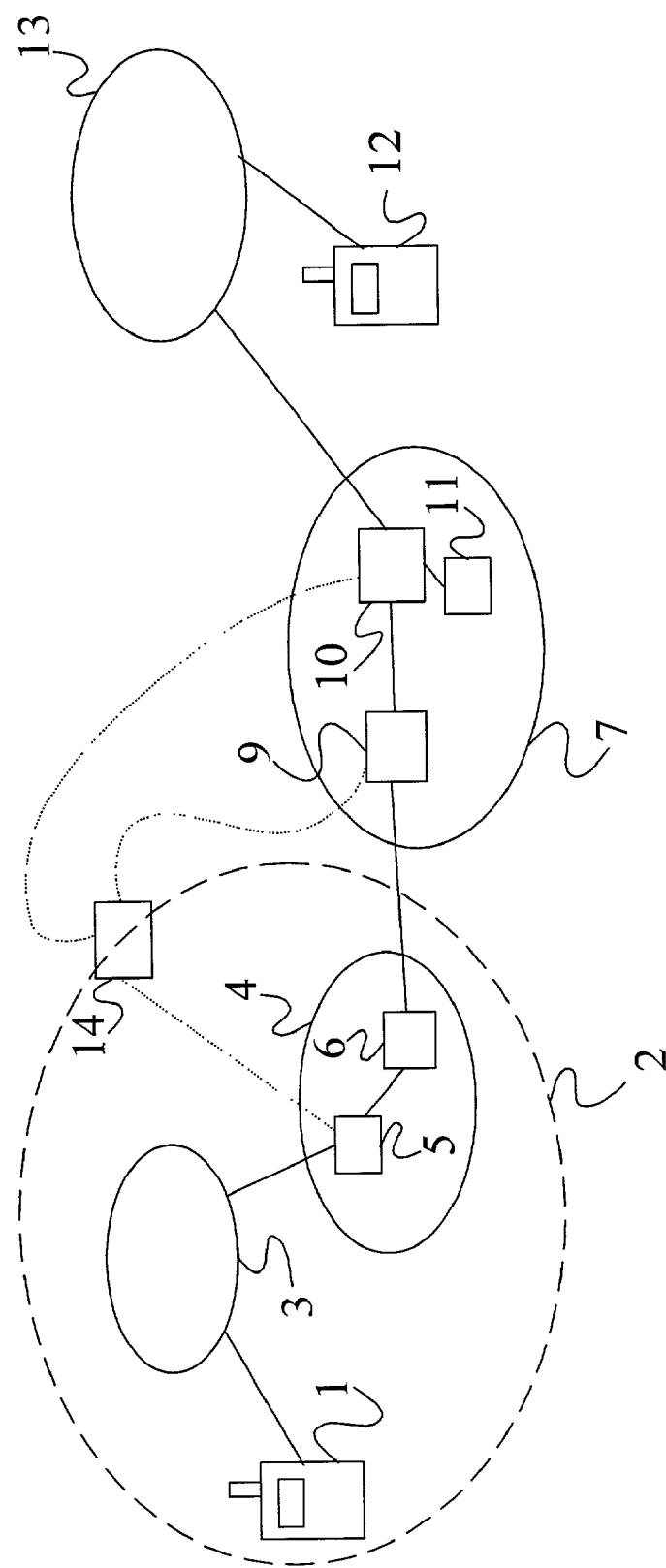
FIG. 1 illustrates schematically a communication system for facilitating multimedia connections.

FIG. 1 illustrates schematically a typical scenario where User Equipment (UE) 1 is a subscriber of a cellular telephone network 2. The subscriber using the UE is identified in the network 2 by a unique subscriber identity, and the network is referred to as the subscriber's "home" network. The home network comprises a Radio Access Network 3 and a General Packet Radio Service (GPRS) network 4 (as well as a circuit switched core network which is not illustrated in FIG. 1). Within the GPRS network 4, two nodes relevant to the UE 1 can be identified. These are the Serving GPRS Support node (SGSN) 5 and the Gateway GPRS Support Node (GGSN) 6.

The role of the SGSN 5 is to maintain subscription data (identities and addresses) and to track the location of the UE within the network. The role of the GGSN 6 is to maintain subscription information and allocated IP addresses and to track the SGSN to which the UE 1 is attached. The GGSN 6 is coupled to an IP network. Typically, when the UE 1 is turned on it "attaches" itself to the GGSN and a PDP context is established between the UE 1 and the GGSN 6. This context provides a "pipe" for transporting data from the UE 1 to the GGSN 6. This process involves the allocation of an IP address to the UE 1. Typically, the routing prefix part of the address is a routing prefix allocated to the GGSN 6.

Also illustrated in FIG. 1 is an IP Multimedia Core Network Subsystem (IMSS) 7 which contains all of the elements required to provide IP based multimedia services. The functionality provided by the IMSS 7 is set out in 3GPP TS 23.228. The IMSS 7 consists of a set of nodes which are coupled to an IP backbone network. This network is also connected to the GGSN 6 of the GPRS network 4. Illustrated within the IMSS 7 are a proxy call state control function (P-CSCF) node 9 and a serving call state control function (S-CSCF) node 10. It is assumed here that the IMSS is owned by the operator of the cellular telephone network 2 (although this need not be the case).

The S-CSCF 10 performs the session control services for the UE, and maintains a session state as needed by the network operator for support of services. The main function performed by the S-CSCF 10 during a session is the routing of incoming and outgoing call set-up requests. The main function performed by the P-CSCF 9 is to route SIP messages between the UE and the home network.

Following GPRS attach by the UE 1, the UE must "discover" the identity (i.e. IP address) of the P-CSCF which it should use. This is done using one of the following mechanisms:

1. Use of DHCP to provide the UE with the domain name of a Proxy-CSCF and the address of a Domain Name Server (DNS) that is capable of resolving the Proxy-CSCF name.
2. Transfer of a Proxy-CSCF address within the PDP Context Activation signalling to the UE (this second alternative is used for terminals not supporting DHCP).

The UE 1 will then notify the S-CSCF 10 of its current location, i.e. the IP address allocated by the GGSN, via the P-CSCF 9 (this process requires authentication of the UE 1 to the S-CSCF and vice versa and makes use of the unique subscriber identity). The S-CSCF 10 makes this information available to a Home Subscriber Server 11 which is used to route subsequent incoming calls to the UE 1.

Illustrated in FIG. 1 is a UE 12 belonging to a subscriber referred to below as the B-subscriber. The UE 12 is attached to its own network 13. This network may consist of a RAN, GPRS network and IMSS network, mirroring the networks used by the UE 1. The following discussion assumes that the A-subscriber wishes to establish a multimedia call to the B-subscriber. The A-subscriber first sends a SIP INVITE message to the P-CSCF node 9. The INVITE message contains a SIP address of the B-subscriber (e.g. john.smith@sipserver.com) as well as an identification of the service required. The INVITE message also includes a SIP Call-ID allocated to the call by the A-subscriber. The P-CSCF node 9 forwards the INVITE message to the S-CSCF node 10.

The S-CSCF 10 verifies the rights of the A-subscriber to use the requested service (identified in the INVITE message). The S-CSCF must then identify the IP address of the B-subscriber. It does this by using a look-up table mapping SIP addresses to IP addresses. For a given SIP address, the table provides the IP address of the "home" network of the corresponding subscriber. The identified IP address is used to forward the INVITE message to the S-CSCF 10 in the B-subscriber's home IMSS network. Using the SIP address contained in the INVITE message, the home S-CSCF identifies the current IP address of the B-subscriber (an IP address is allocated dynamically to the B-subscriber), and forwards the INVITE message to that address. Upon receipt of the INVITE message, and assuming that the B-subscriber answers the call, an OK message is returned to the A-subscriber. Typically this message is sent via the S-CSCF.

At some point during or after this procedure, a secondary PDP context is established between the A-subscriber and the GGSN 6. The PDP context has a Quality of Service (QoS) suitable for the call being established (similarly, a secondary PDP context will be established between the B-subscriber and the GGSN 6 of his GPRS access network 4), and is allocated a GPRS charging identity. (Secondary PDP contexts may not be necessary if the primary PDP contexts support the required QoS). It is assumed here that the primary and secondary PDP contexts established between the A-subscriber and the GGSN 6 share the same IP address. Both the PDP context and the GPRS charging identity are associated in a subscriber look-up table at the GGSN 6 with the IP address allocated to the A-subscriber.

As already discussed above, CAP charging messages may be generated within the GPRS access network 4 and the IMSS in order to facilitate real time billing (the IMSS may alternatively use DIAMETER to communicate with the CCN). In particular, the SGSN 5 and the S-CSCF 10 may generate CAP messages for a given connection. The CAP charging messages generated by the SGSN 5 may relate to the volume of data sent during the call, whilst the CAP messages generated by the S-CSCF may relate to the nature of the call (e.g. voice, videotelephony, etc) and the duration. Typically, all CAP messages associated with the call are sent to a Charging Control Node (CCN) belonging to the operator of the cellular telephone network 2 and the IMSS 7. For the call in question (i.e. from the UE 1 to the UE 12), CAP messages will be generated by the GPRS access network 4 and the IMSS 7 and will be charged to the A-subscriber's account.

To aid the allocation of CAP charging messages at the CCN 14, upon receipt of the SIP INVITE message at the P-CSCF node 9, that node will identify the GGSN 6 using the A-subscriber's IP address which is contained within the INVITE message. The P-CSCF 9 then returns to the GGSN 6 the SIP Call_ID allocated to the requested connection. The message containing the Call-ID also contains the A-subscriber's IP address. Using the IP address, the GGSN 6 is able to identify the PDP context which will carry the call traffic between the UE 1 and the GGSN 6. The SIP Call-ID is entered into the subscriber look-up table at the GGSN and associated with the GPRS charging identity and IP number. This information is also relayed to the SGSN 5.

At the SGSN 5, each time a CAP message is generated in connection with the call between the A and B subscribers, the SIP Call-ID is included in the CAP message together with the subscriber identity. When the CCN 14 receives a CAP message from the SGSN 5, the CCN 14 is able to allocate the charge to a subscriber based on the subscriber identity. Furthermore, the charge can be allocated to a particular call based on the SIP-Call ID. (The GGSN 6 may incorporate the SIP Call-ID into CDRs sent to a billing or mediation system.)

The SIP Call-ID is similarly contained in CAP messages generated by the S-CSCF 10 and sent to the CCN 14, allowing those charges to be allocated to respective calls. The CCN 14 can thus generate for a subscriber a single charge for each multimedia call. In some cases, during the setting up of the connection and following receipt at the GGSN 6 of the SIP Call-ID and the A-subscriber's IP address, the GGSN 6 may return the GPRS charging identity and the GGSN node identity to the P-CSCF 9. This data may be forwarded to the S-CSCF 10 for inclusion in CAP messages generated at the S-CSCF.

Figure 2:
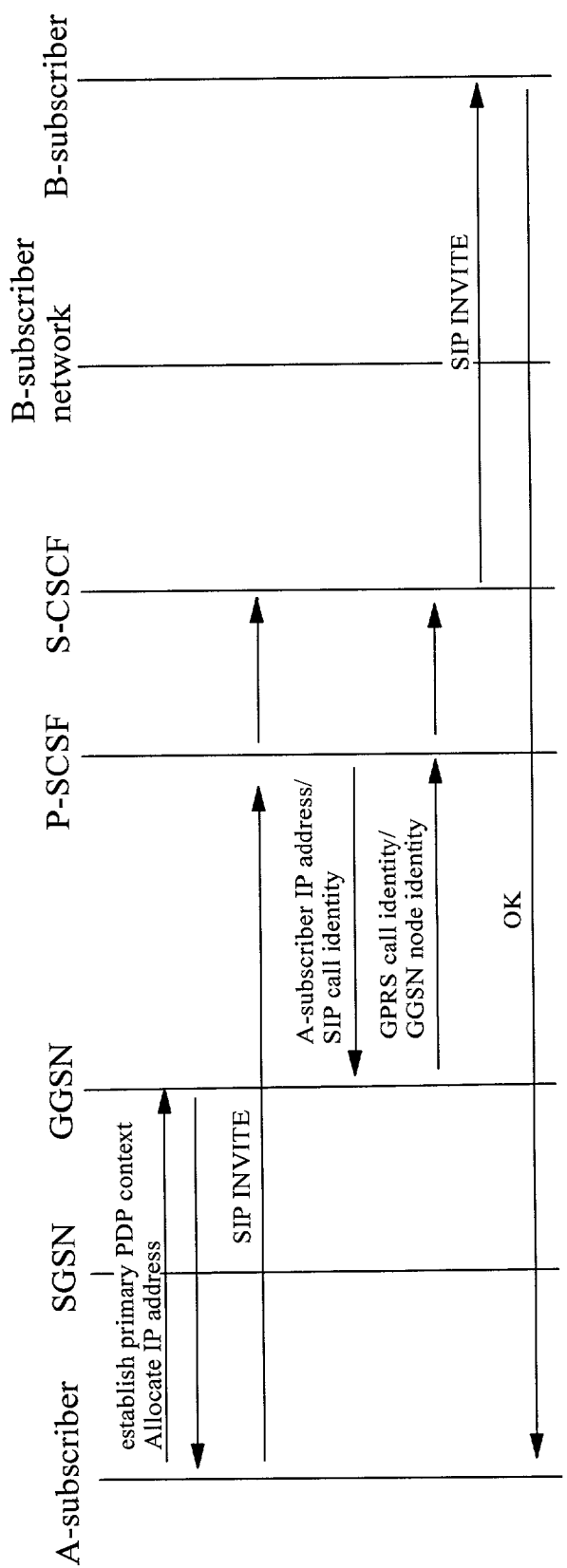
FIG. 2 is a signalling diagram illustrating a charging mechanism for a multimedia connection established over the system of FIG. 1.
Figure 3:
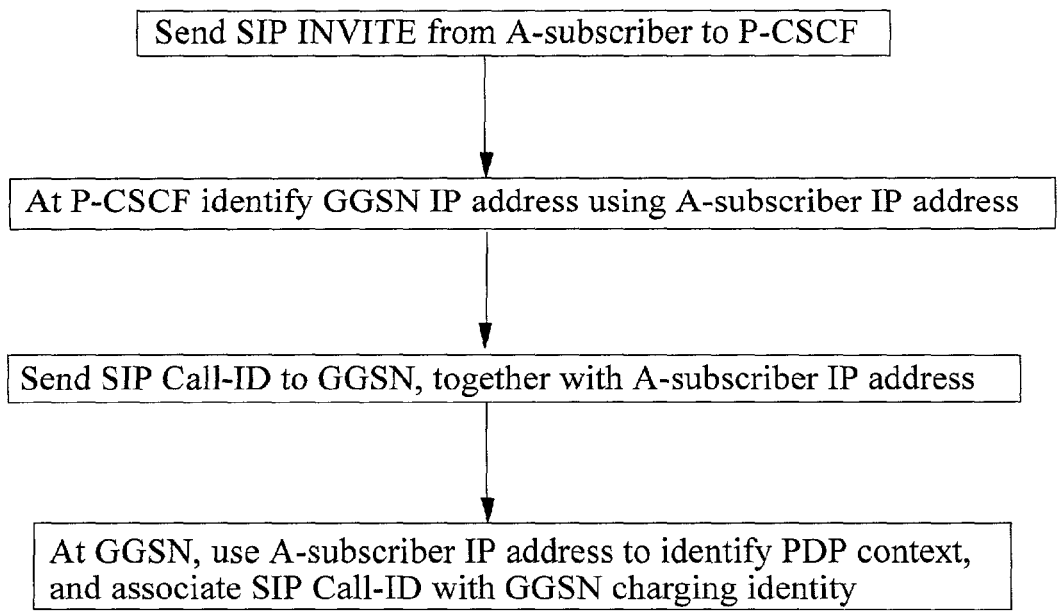
FIG. 3 is a flow diagram illustrating the main steps of the charging mechanism.

The mechanism described above is further illustrated by the signalling diagram of FIG. 2, and the flow diagram of FIG. 3. It will be appreciated that the mechanism described above may be used to associate charging messages generated on the B-subscriber side (i.e. within network 13). Thus, when the B-subscriber responds to an incoming call, returning a SIP answer message to his P-CSCF via a GGSN of his access network, the P-CSCF identifies the GGSN using the B-subscriber's IP address contained in the SIP answer message. The SIP Call-ID is then sent to the GGSN together with the B-subscriber's IP address. The B-subscriber's access network then identifies the PDP context and forwards the information to the SGSN which can include the SIP Call ID in subsequent CAP charging messages.

The concept embodied in this system may be used to reallocate costs from a mobile subscriber to a service provider. Consider for example the situation where a service provider operates a WAP or WWW server connected to the Internet. A user is able to download and view information from the server. The information includes certain advertisements. In return for downloading and viewing the adverts, the operator of the WWW/WAP server accepts the costs levied by the user's access network for transporting the information to the user. This is facilitated by the service provider sending to the GGSN to which the user is attached, the user's IP address. This allows the GGSN to identify the PDP context carrying user data. The service provider may also send his identity to the GGSN, so that this can be included in CAP messages generated by the SGSN. It may be necessary for the service provider to identify to the GGSN the (approximate) volume of data associated with the connection to prevent the service provider being charged for unrelated data transported over the same PDP context. Data associated with the connection may be identified in some other way, e.g. by sending the IP address of the WWW/WAP server to the GGSN and identifying at the GGSN packets containing this IP address as their source address. The invention may also be employed to facilitate the provision of freephone services to customers of a service provider.

It will be appreciated by the person of skill in the art that various modifications may be made to the above described embodiments without departing from the scope of the present invention. For example, rather than using an extension to the SIP protocol to handle the exchange of charging identifiers between the GGSN and the P-CSCF, the CAP protocol may be used to exchange these identifiers via a CCN.

The invention claimed is:

1. A method of enabling charging information generated within a packet switched access network to be associated with charging information generated within a service network coupled to the access network, the charging information relating to a service facilitated by the service network, the method comprising:
    receiving a service initiation message at a node of the service network, the message containing an IP address allocated to a party initiating the service;
    sending from the node of the service network to the access network, a charging association message containing the IP address and a service connection identifier; and
    upon receipt of the charging association message at the access network, identifying an access network session associated with the IP address.

2. The method according to claim 1, further comprising:
    at the access network, identifying a charging identity of the access network associated with the identified access network session.

3. The method according to claim 1,
    wherein the access network is a GPRS access network and the service network is an IP Multimedia Core Network Subsystem (IMSS),
    wherein the charging association message relates to a multimedia call facilitated by the IMSS and carried by the GPRS network, and
    wherein the service initiation message is a SIP INVITE or answer message and the service connection identifier is a SIP call identity.

4. The method according to claim 1, further comprising:
    sending from the access network to the service network an access network charging identity in response to the receipt of the charging association message at the access network.

5. The method according to claim 1, further comprising:
    including in the charging information generated by one or both of the access network and the service network, a received identifier.

6. The method according to claim 3, further comprising:
    sending the charging association message from a node of the IMSS implementing a call state control function (CSCF) to a Gateway GPRS Support Node (GGSN) of the GPRS network.

7. The method according to claim 6, wherein the GGSN forwards the SIP call identity to a Serving GPRS Support Node (SGSN) of the GPRS network.

8. The method according to claim 6 further comprising;
    where a GPRS charging identity is sent from the GPRS network to the IMSS, sending the service connection identifier from the GGSN of the GPRS network to the node of the IMSS implementing the CSCF.

9. The method according to claim 6 further comprising;
    sending the GGSN node identity, from the GGSN to the node of the IMSS implementing the CSCF, for inclusion in the charging information generated within the IMSS.

10. The method according to claim 1, further comprising:
    identifying at the service network an IP address of an access network gateway node using the IP address of the party initiating the service.

11. The method according to claim 1, wherein messages are transferred between the access network and the service network using a SIP protocol.

12. The method according to claim 1, further comprising:
    sending from the service network to the access network an indication of an amount of data involved in an execution of the service in one or both transmission directions; and
    using the indication at the access network to generate charging messages in respect of data associated with the service.

13. The method according to claim 1, further comprising:
    sending information from the service network to the access network information to allow the access network to separate a byte stream associated with the service from other data.

14. The method according to claim 13, wherein the information is an IP address identifying a correspondent host for the service or a port number of an UE bearing a cost of the service.

15. A method of reallocating charges from a subscriber to a service provider, the charges relating to a use of a packet switched access network to carry IP data associated with a service facilitated by the service provider, the method comprising:

sending a service identifier and a subscriber's IP address from the service provider to a gateway node of the access network; and at the gateway node, using the IP address to identify data associated with the service, and including the service identifier in charging information messages generated by the gateway node or another node of the access network in respect of the identified data, and/or sending a gateway node charging identity from the gateway node to the service provider for inclusion in charging information messages generated by the service provider.

16. The method according to claim 15, wherein the service identifier identifies the service provider, such that the generated charging information messages will be allocated to the service provider.

17. The method according to claim 15, wherein the service provider identifies an IP address of the gateway node on the basis of an IP address belonging to an initiator of the service and the service identifier and the subscriber's IP address are sent to the gateway node using the identified gateway node IP address.

18. An apparatus to enable charging information generated within a packet switched access network to be associated with charging information generated within a service network coupled to the access network, the charging information relating to a service facilitated by the service network, the apparatus comprising:

a receiver configured to receive a service initiation message at a node of the service network, the message containing an IP address allocated to a party initiating the service;

a transmission circuitry configured to send from the node of the service network to the access network a charging association message containing the IP address and a service connection identifier; and a processing circuitry configured to identify an access network session associated with the IP address upon receipt of the charging association message at the access network.

19. The apparatus according to claim 18, wherein the processing circuitry is configured to identify a charging identity of the access network associated with the identified access network session at the access network.

20. The apparatus according to claim 18,
wherein the access network is a GPRS access network and the service network is an IP Multimedia Core Network Subsystem (IMSS),
wherein the charging association message relates to a multimedia call facilitated by the IMSS and carried by the GPRS network, and
wherein the service initiation message is a SIP INVITE or answer message and the service connection identifier is a SIP call identity.

21. The apparatus according to claim 18, further comprising:

a transmitting circuitry at the access network configured to send from the access network to the service network an access network charging identity in response to the receipt of the charging association message at the access network.

22. The apparatus according to claim 18, wherein the transmitting circuitry is configured to include a received identifier in the charging information generated by one or both of the access network and the service network.

23. The apparatus according to claim 20, wherein the transmission circuitry is configured to send the charging association message from a node of the IMSS implementing a call state control function (CSCF) to a Gateway GPRS Support Node (GGSN) of the GPRS network.

24. The apparatus according to claim 23, wherein the GGSN is configured to forward the SIP call identity to a Serving GPRS Support Node (SGSN) of the GPRS network.

25. The apparatus according to claim 23, wherein the transmission circuitry is configured to send a GPRS charging identity from the GPRS network to the IMSS and to send the service connection identifier from the GGSN of the GPRS network to the node of the IMSS implementing the CSCF.

26. The apparatus according to claim 23, wherein the transmission circuitry is configured to send the GGSN node identity, from the GGSN to the node of the IMSS implementing the CSCF, for inclusion in the charging information generated within the IMSS.

27. The apparatus according to claim 18, wherein the processing circuitry is configured to identify at the service network an IP address of an access network gateway node using the IP address of the party initiating the service.

28. A gateway node for reallocating charges from a subscriber to a service provider, the charges relating to a use of a packet switched access network where the gateway node is located to carry IP data associated with a service facilitated by the service provider, comprising:

a receiver configured to receive a service identifier and a subscriber's IP address from the service provider to the gateway node; and processing circuitry configured to use the IP address to identify data associated with the service, and including the service identifier in charging information messages generated by the gateway node or another node of the access network in respect of the identified data, and/or sending a gateway node charging identity from the gateway node to the service provider for inclusion in charging information messages generated by the service provider.

29. The gateway node according to claim 28, wherein the service identifier identifies the service provider such that the generated charging information messages will be allocated to the service provider.

* * * * *